Figure 1:
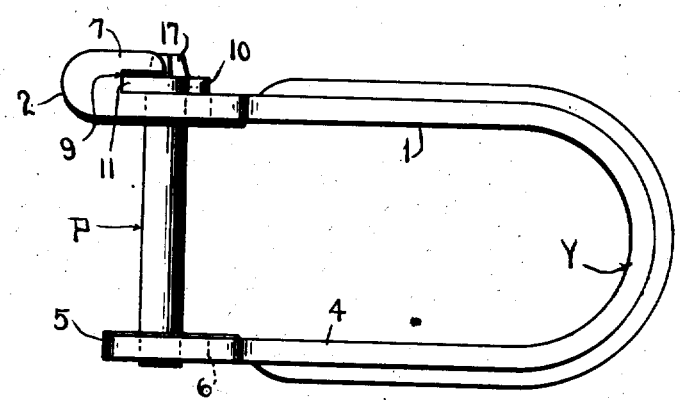

M. A. NELSON.

CLEVIS.

APPLICATION FILED MAR. 14, 1912.

Reissued Oct. 1, 1912.

13,470.

Witnesses

L. B. James.

W. L. Collamer.

Inventor

M. A. Nelson by H. R. Wilson & Co

Attorneys

BEST AVAILABLE COPY

UNITED STATES PATENT OFFICE.

MILFORD A. NELSON, OF FOWLER, COLORADO.

CLEVIS.

13,470. Specification of Reissued Letters Patent. Reissued Oct. 1, 1912.

Original No. 1,009,552, dated November 21, 1911. Serial No. 609,472. Application for reissue filed March 14, 1912. Serial No. 683,906.

*To all whom it may concern:*

Be it known that I, MILFORD A. NELSON, a citizen of the United States of America, residing at Fowler, in the county of Otero and State of Colorado, have invented certain new and useful Improvements in Clevises, of which the following is a specification.

This invention relates to clevises, and more especially to the pins thereof; and the object of the same is to provide a clevis pin with a peculiar form of head and the clevis body with a peculiarly shaped overhanging lip with which the head is adapted to engage at times so as to prevent the accidental dislodgment and loss of the pin and yet to permit the manual removal of the latter when desired. This object is accomplished by the construction hereinafter more fully described and claimed, and as shown in the drawings wherein—

Figure 3:
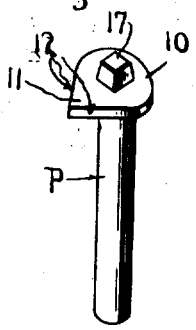
Figure 2:
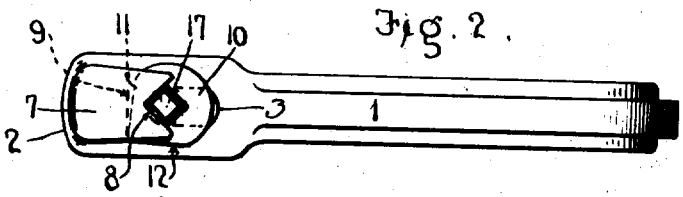
Figure 4:
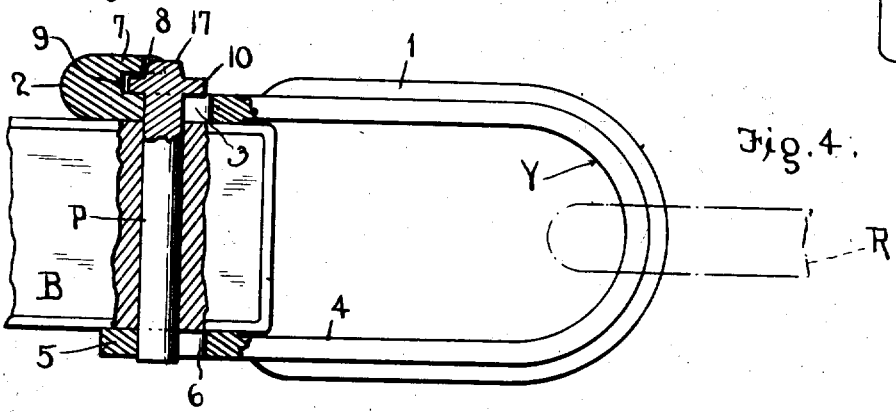
Figure 5:
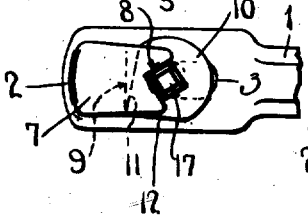
Figure 6:
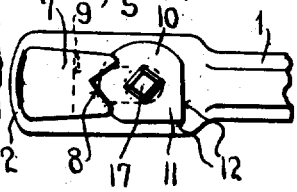
Figure 7:
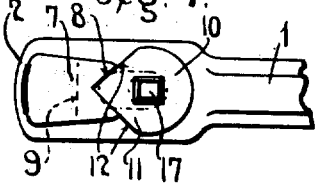

Figure 1 is a side elevation of this improved clevis with its parts in their working position, and Fig. 2 is a plan view of the same. Fig. 3 is a perspective detail of the clevis pin removed. Fig. 4 is a side elevation, partly in section, showing the use of the clevis in connection with a plow beam or the like and the latter as exerting strain on the pin and bearing the same to the rear. Figs. 5, 6 and 7 are plan views of the extremity of the upper yoke-arm with the pin therein and its head in several different positions as will be explained below.

The yoke member Y of this clevis is substantially U-shaped in side elevation and is preferably made of wrought iron although in some instances it may be cast, and its extremities are pierced with eyes through which removably passes the pin P. The draft is attached to a ring R which engages the bend of the yoke Y, and this portion of the clevis may therefore be called its front end: the member drawn is here represented by the beam B whose front end passes into what will therefore be the rear end of the clevis and is pierced with an upright opening through which is dropped the pin P in a manner well illustrated in Fig. 4 of the drawings.

The upper arm 1 of the yoke is by preference slightly enlarged at its rear extremity into a head 2, and through the same is formed an elongated opening or slot 3, while the lower arm 4 has a similar head 5 and a similar slot 6 disposed directly beneath the slot 3. Rising from the rear end of the head 2 is a lip 7 overhanging and spaced from said head and projecting forward over the same for a short distance and provided in its extremity with a V-shaped notch 8, and under the lip is formed a transverse shoulder 9 extending straight across the upper face of the head at some little distance beyond the rear end of the opening 3 as best seen in Fig. 4.

Coacting with the yoke is a pin P best seen detached in Fig. 3, its shank being cylindrical and of a size to fit rather closely within the width of the openings 3 and 6 but to have a slight movement therein longitudinally of the yoke by reason of their elongation. The head of this pin is made rather flat so that it may pass under the lip 7, and comprises a circular flange 10 extending a little over half way around the axis of the shank, and a tongue 11 projecting radially from said axis diametrically opposite the center of said flange and to a slightly greater degree than the width of the flange, its beveled edges 12 leading from the tip of the tongue to the extremities of the arcuate periphery of the flange. Rising from or cast integral with the pin head is a nib 17 whose axis is coincident with that of the shank of the pin, and the nib is by preference of rectangular contour and shaped like a truncated pyramid so that it may receive a wrench, and the nib is smaller in its greatest diameter than the diameter of the shank; for a purpose to appear below. The disposition of said nib with respect to the tongue 11 is such that two of its flat sides stand at right angles to and the other two parallel with a line drawn through the longest radius of the head which of course extends through the tip of the tongue 11.

When draft is applied, the parts stand as seen in Figs. 1, 2, 4 and 5, the shank of the pin is drawn rearward within the openings or slots 3 and 6 and its tongue 11, contacting with the transverse shoulder 9, is turned aside so that one of the beveled edges 12 of the head is drawn nearly into contact with said shoulder 9, the flange 10 passes under the lip 7 as seen in Fig. 5, and the pin cannot possibly become displaced. The nib 17 now stands within the V-shaped notch 8 and prevents anything from catching under the points of the lip at either side of such notch, and yet the faces of said nib diverge upward away from the walls of the notch so that it may be possible to turn the pin. Continued use and the swinging of the clevis from side to side or the turning of the beam from side to side as the clevis is drawn forward, may, however, rotate the pin slightly so that its tongue no longer rests against the shoulder 9 but assumes possibly the position illustrated in Fig. 6; and this view also shows how at times the entire pin may move bodily forward within the slots 3 and 6 as when the draft is interrupted or the beam moves forward. The tongue 11 is not now in contact with the shoulder 9 at any point, but it will be observed that the flange 10 is so wide that it underlies the tip of the notched lip (as in fact it did to a greater extent in Fig. 5) and therefore at no point during the revolution of the pin while this condition remains, can it become displaced. In Fig. 7 is shown the position the parts must be caused to assume when the pin is to be removed. Here its shank is moved to the front ends of the slots 3 and 6 and rotated in its axis until the tip of the tongue 11 registers with the V-shaped notch 8 so that the longest diameter of the head alines with the longitudinal plane of the yoke Y, and by relaxing the pressure exerted by the load the pin can then be lifted out of place and the parts disconnected.

What is claimed as new is:

1. In a clevis, the combination with a yoke having openings in its upper and lower arms, the uppermost opening being elongated longitudinally of the arm, and an integral lip rising from the rear end of this arm and projecting forward and having a notch in its extremity; of a pin whose shank fits said openings loosely and whose head comprises a circular flange partway around the shank and a tongue radially wider than the flange, both adapted to pass under the lip and prevent the rise of the pin save when its shank stands in the forward end of the uppermost opening and said tongue is alined with said notch.

2. In a clevis, the combination with a yoke having slots in its upper and lower arms, and a lip rising from the upper arm and projecting toward the slot therein and having a notch in its extremity; of a pin whose shank fits movably in said slots and whose head comprises a circular flange extending halfway around the shank and a tongue radially wider than the flange, both adapted to pass under said lip and prevent the rise of the pin save when its shank stands in the forward ends of said slots and said tongue is alined with said notch.

3. In a clevis, the combination with a yoke having longitudinally disposed slots in its upper and lower arms, and an integral lip rising from the rear end of the upper arm and projecting toward the slot therein, the lip overhanging a transverse shoulder and having a V-shaped notch in its extremity; of a pin whose shank fits movably in said slots and whose head comprises a circular flange extending part way around the shank and a tapering tongue radially wider than the flange, both adapted to pass under said lip and prevent the rise of the pin save when its shank stands in the forward ends of said slots and said tongue is alined with said notch.

4. In a clevis, the combination with a yoke having slots in its arms, the uppermost slot being elongated longitudinally of the arm, and a lip rising from this arm and projecting toward the slot, the lip overhanging a straight transverse shoulder and having a notch in its extremity; of a pin whose shank fits said slots loosely and whose head includes a flange around the shank and a tapering tongue projecting from one side of said shank to a greater extent than the width of the flange, the tongue and the flange being adapted to pass under said lip, substantially as described.

5. In a clevis, the combination with a yoke having slots in its arms, and a lip rising from the upper arm and projecting toward the slot therein, the lip overhanging a transverse shoulder and having a V-shaped notch in its extremity; of a pin whose shank fits movably in said slots and whose head includes a flange projecting under said lip when the pin shank is in the front ends of said slots and a tapering tongue wider than said flange but adapted to pass through the notch in the lip, and a rectangular nib rising from said head and standing in said notch but out of contact with its wall when the pin shank is in the rear ends of said slots.

6. In a clevis, the combination with a yoke having slots in its arms, and a lip rising from the upper arm and projecting toward the slot therein and having a notch in its extremity; of a pin whose shank fits movably in said slots and whose head includes a flange projecting under said lip when the pin shank is in the front ends of said slots and a flange too wide to pass by the lip and a tongue wider than said flange but shaped to pass through the notch in the lip, and a rectangular nib rising from said head and standing in said notch but out of contact with its wall when the pin shank is in either end of said slots.

In testimony whereof I have hereunto set my hand in presence of two subscribing witnesses.

MILFORD A. NELSON.

Witnesses:
J. Louis Kohn,
D. B. Kennedy.